United States Patent
Liu et al.

(10) Patent No.: US 12,491,617 B2
(45) Date of Patent: *Dec. 9, 2025

(54) METHOD FOR OPERATING A MACHINE TOOL AND MACHINE TOOL

(71) Applicant: Hilti Aktiengesellschaft, Schaan (LI)

(72) Inventors: Qin Liu, Oberschleissheim (DE);
Bernd Gillmeier, Landsberg (DE);
Stefan Schmid, Untermuehlhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 242 days.

This patent is subject to a terminal disclaimer.

(21) Appl. No.: 17/615,248

(22) PCT Filed: Jun. 17, 2020

(86) PCT No.: PCT/EP2020/066743
§ 371 (c)(1),
(2) Date: Nov. 30, 2021

(87) PCT Pub. No.: WO2020/260088
PCT Pub. Date: Dec. 30, 2020

(65) Prior Publication Data
US 2022/0250227 A1 Aug. 11, 2022

(30) Foreign Application Priority Data
Jun. 27, 2019 (EP) ..................... 19182851

(51) Int. Cl.
*B25B 23/147* (2006.01)
*B23B 45/00* (2006.01)
*B25F 5/00* (2006.01)

(52) U.S. Cl.
CPC ............ *B25F 5/001* (2013.01); *B23B 45/008* (2013.01); *B25B 23/1475* (2013.01)

(58) Field of Classification Search
CPC .......... B25F 5/001; B25F 5/00; B23B 45/008; B23B 45/02; B25B 23/1475;
(Continued)

(56) References Cited

U.S. PATENT DOCUMENTS 4,110,829 A * 8/1978 Boys ................... B25B 23/1456
708/847
4,938,109 A * 7/1990 Torres .................. E21B 19/166
173/181

(Continued)

FOREIGN PATENT DOCUMENTS

CN 101714647 A 5/2010
CN 101771379 A 7/2010
(Continued)

OTHER PUBLICATIONS

International Search Report of PCT/EP2020/066743, dated Sep. 25, 2020.
(Continued)

*Primary Examiner* — Robert F Long
(74) *Attorney, Agent, or Firm* — Davidson Kappel LLC

(57) ABSTRACT

A method for operating a machine tool having a battery and an electric motor which is designed to rotationally drive an output shaft that can be coupled to a tool is described, a control device for actuating the electric motor and a device for determining a parameter being provided, it being possible for the machine tool to be operated in a first operating mode and a second operating mode, and the control device transferring the machine tool from the first operating mode into the second operating mode if the parameter determined by the device exceeds or falls below a defined threshold value. The electric motor (3) is controlled in the second operating mode by an amperage profile comprising current pulses (10, 10', 11), a level a maximum amperage (A1, A1', A2) of the current pulses (10, 10', 11) being varied depend- (Continued)

ing on an actual charge status of the battery (2). A machine tool that can be operated using a method of this kind is also described.

22 Claims, 4 Drawing Sheets

(58) Field of Classification Search
CPC ..... B25B 23/1456; B25B 21/00; H02P 29/20; H02P 29/40
USPC ..... 173/1–2, 13, 18–20, 184, 29–31, 38–39, 173/45–53
See application file for complete search history.

(56) References Cited

U.S. PATENT DOCUMENTS

| | | | |
|---|---|---|---|
| 6,286,609 B1* | 9/2001 | Carrier | H02P 7/291 173/217 |
| 6,353,705 B1* | 3/2002 | Capps | H02P 7/29 388/830 |
| 6,479,958 B1 | 11/2002 | Thompson et al. | |
| 6,508,313 B1* | 1/2003 | Carney | B25B 23/1475 173/171 |
| 7,410,006 B2* | 8/2008 | Zhang | B25B 21/00 173/179 |
| 7,552,781 B2* | 6/2009 | Zhang | B25F 5/001 173/4 |
| 7,789,169 B2* | 9/2010 | Berry | B25C 1/06 173/217 |
| 8,418,778 B2* | 4/2013 | Eshleman | B25B 21/00 173/183 |
| 9,364,944 B2* | 6/2016 | Aoki | B25D 16/003 |
| 9,475,180 B2* | 10/2016 | Eshleman | B25B 23/14 |
| 11,344,299 B2* | 5/2022 | Yates | A61B 17/068 |
| 11,406,380 B2* | 8/2022 | Yates | H02J 7/0068 |
| 11,759,224 B2* | 9/2023 | Shelton, IV | A61B 17/29 606/143 |
| 2002/0153856 A1* | 10/2002 | Gilmore | B25B 23/147 318/599 |
| 2004/0226728 A1* | 11/2004 | Boeni | B25D 11/005 173/176 |
| 2005/0073282 A1* | 4/2005 | Carrier | H01M 10/482 320/106 |
| 2006/0081386 A1* | 4/2006 | Zhang | B25B 21/00 173/2 |
| 2006/0222930 A1* | 10/2006 | Aradachi | H01M 50/213 429/96 |
| 2006/0233621 A1* | 10/2006 | Schell | B23B 45/008 408/139 |
| 2007/0089484 A1* | 4/2007 | Bailey | G01N 30/88 73/23.42 |
| 2009/0101379 A1* | 4/2009 | Du | H02P 7/29 173/176 |
| 2010/0084150 A1 | 4/2010 | Suzuki et al. | |
| 2010/0198220 A1* | 8/2010 | Boudreaux | A61B 17/07207 606/52 |
| 2010/0218966 A1* | 9/2010 | Liebhard | A01G 3/053 318/722 |
| 2010/0265097 A1* | 10/2010 | Obatake | B25F 5/00 340/870.4 |
| 2010/0320252 A1* | 12/2010 | Viola | A61B 17/068 227/176.1 |
| 2011/0022032 A1* | 1/2011 | Zemlok | A61B 17/07207 606/1 |
| 2011/0162860 A1* | 7/2011 | Gut | B25F 5/001 173/1 |
| 2011/0214894 A1* | 9/2011 | Harada | B25B 21/02 173/2 |
| 2011/0303427 A1 | 12/2011 | Tang et al. | |
| 2012/0103643 A1* | 5/2012 | Binder | B25F 5/001 173/1 |
| 2012/0199372 A1 | 8/2012 | Nishikawa et al. | |
| 2012/0225328 A1* | 9/2012 | Nakanouchi | B60L 53/65 429/7 |
| 2012/0279736 A1 | 11/2012 | Tanimoto et al. | |
| 2013/0014967 A1 | 1/2013 | Hitachi et al. | |
| 2013/0037288 A1* | 2/2013 | Schell | B25F 5/001 173/176 |
| 2013/0261681 A1* | 10/2013 | Bittenson | A61B 17/92 606/86 R |
| 2014/0008090 A1* | 1/2014 | Kokinelis | B25F 5/02 29/428 |
| 2014/0028226 A1* | 1/2014 | Mergener | B25F 5/00 318/400.09 |
| 2014/0102741 A1* | 4/2014 | Sekino | B25B 21/02 173/181 |
| 2014/0352992 A1 | 12/2014 | Wu et al. | |
| 2015/0041164 A1 | 2/2015 | Sergyeyenko et al. | |
| 2015/0053749 A1* | 2/2015 | Shelton, IV | A61B 90/03 227/181.1 |
| 2015/0306748 A1 | 10/2015 | Hsu et al. | |
| 2016/0342151 A1* | 11/2016 | Dey, IV | G06F 3/04847 |
| 2017/0047819 A1* | 2/2017 | Forster | B25F 5/00 |
| 2017/0202605 A1* | 7/2017 | Shelton, IV | A61B 18/1445 |
| 2017/0246732 A1 | 8/2017 | Dey, IV | |
| 2017/0281187 A1* | 10/2017 | Shelton, IV | A61B 17/3211 |
| 2018/0132850 A1* | 5/2018 | Leimbach | A61B 17/07207 |
| 2018/0290275 A1 | 10/2018 | Asplund et al. | |
| 2018/0304453 A1* | 10/2018 | Schaer | B25F 5/001 |
| 2019/0143501 A1* | 5/2019 | Wong | H02P 6/08 173/5 |
| 2019/0190303 A1* | 6/2019 | Geng | H01M 10/48 |
| 2019/0227528 A1* | 7/2019 | Abbott | G05B 13/0265 |
| 2020/0052479 A1* | 2/2020 | Friedman | H02H 7/20 |
| 2021/0229259 A1* | 7/2021 | Dey, IV | B25D 17/245 |
| 2022/0226974 A1* | 7/2022 | Liu | B25B 23/1475 |

FOREIGN PATENT DOCUMENTS

| | | | | |
|---|---|---|---|---|
| CN | 102528770 A | 7/2012 | | |
| CN | 102639301 A | 8/2012 | | |
| CN | 102770248 A | 11/2012 | | |
| CN | 102794732 A | 11/2012 | | |
| CN | 104218868 A | 12/2014 | | |
| CN | 108136571 B1 | 6/2018 | | |
| DE | 102010003977 A1 * | 7/2011 | | H02P 29/0241 |
| EP | 2338646 A2 | 6/2011 | | |
| EP | 3170624 A1 * | 5/2017 | | B23B 45/02 |
| EP | 3231371 A1 * | 10/2017 | | A61B 17/068 |
| JP | 2002335633 A | 11/2002 | | |
| JP | 2005324887 A | 11/2005 | | |
| JP | 2011212803 A | 10/2011 | | |
| WO | WO 2011122695 A1 | 10/2011 | | |
| WO | WO-2017085039 A1 * | 5/2017 | | B23B 45/02 |
| WO | WO 2020/260090 A1 | 12/2020 | | |

OTHER PUBLICATIONS

International Search Report of PCT/EP2020/066749, dated Sep. 18, 2020.

Song Qingshan & Discussion on fast charging of Ni—Cd batteries, electronic industry, vol. 10, Issue 4, Publishing date: Sep. 29, 2005; pp. 217-218, See English Abstract and machine translation.

* cited by examiner

METHOD FOR OPERATING A MACHINE TOOL AND MACHINE TOOL

The present invention relates to a method for operating a machine tool having a battery and an electric motor. Furthermore, the present invention relates to a machine tool.

BACKGROUND

In machine tools known from practice, which are designed to have a regulated electric motor that can be operated by a battery, an output torque applied to an output shaft increases and thus a motor current required to provide this output torque increases, for example when drilling a hole of which the drilling depth increases, in order to provide the correspondingly increasing output torque and to maintain a desired rotational speed of a rotor of the electric motor. If a braking torque applied to the output shaft surpasses a performance capacity of the electric motor, the rotor stops, even if the motor current increases. The locked rotor and the high amperage that is applied can damage the electronics and/or the electric motor if there is no hardware protection or software protection present. Likewise, an output shaft can suddenly lock, for example when drilling in a hard surface. As a result, an applied amperage suddenly increases.

In order to prevent damage to the machine tool in these cases, it is known to provide mechanical couplings which decouple the output shaft from the electric motor when a defined output torque is applied to the output shaft, such that the rotor of the electric motor can continue to rotate without the torque that is applied to the output shaft being transmitted to the electric motor.

SUMMARY OF THE INVENTION

However, a mechanical coupling is characterized by a high weight, requires space, and has a negative impact on the manufacturing costs of the machine tool. In addition, the mechanical components are subject to wear and may need to be serviced or replaced. Wear of the mechanical coupling can disadvantageously change a release torque of the coupling, such that a maximum possible release torque of the coupling can decrease during the operation of the coupling. Furthermore, the mechanical coupling could also not work to the desired extent.

In order to eliminate these disadvantages, machine tools having an electronically implemented coupling are known from practice, which coupling is implemented by correspondingly controlling the electric motor, signals from the electric motor being determined and evaluated for this purpose, for example. After a release event has been detected, for example a torque that is applied to the output shaft which exceeds a defined threshold value, or a sudden braking of the drive shaft which is greater than a defined threshold value, or a speed applied to the output shaft which does not reach a minimum threshold value in a defined time interval during startup due to the tool becoming locked, the electric motor is transferred from a first operating mode into a second operating mode in which current pulses are applied to the electric motor. These current pulses give the user haptic feedback that is modeled on and preferably resembles that of a machine tool having a mechanical coupling. In addition, the discontinuous current pulses facilitate the release of a locked tool, which is coupled to the output shaft, in the surface. When the output shaft is free again, the motor torque surpasses the braking torque applied to the output shaft, the rotational speed of the rotor of the electric motor increases, and the electric motor is transferred back into the first operating state.

The operation of the electric motor in the second operating state is disadvantageously very energy-intensive and results in a rapid decrease in the charge level of the battery, in which case it may not be possible to constantly maintain as high a voltage as desired.

The present invention provides a method for operating a machine tool and a machine tool, it being possible to operate the machine tool in the second operating state using as high a voltage as desired over an advantageously long period of time.

Therefore, a method for operating a machine tool having a battery and an electric motor which is designed to rotationally drive an output shaft that can be coupled to a tool is provided, a control device for actuating the electric motor and a device for determining a parameter being provided, it being possible for the machine tool to be operated in a first operating mode and a second operating mode, and the control device transferring the machine tool from the first operating mode into the second operating mode when the parameter determined by the device exceeds or falls below a defined threshold value.

According to the invention, the control device controls the electric motor in the second operating mode by means of an amperage profile comprising current pulses, the maximum level of the current pulses being varied by the control device depending on an actual charge status of the battery.

A machine tool operated using a method according to the invention provides, in a simple manner, a user with haptic feedback comparable to a machine tool having a mechanical coupling, for example in the event of the drive shaft being locked, even without a mechanical coupling being provided. In addition, a machine tool operated using a method according to the invention can advantageously be operated for a long time in the second operating mode by providing the different current pulses with different maximum amperages in comparison to a machine tool to which high current pulses that are in each case identical are applied in the second operating mode for releasing the output shaft. If the machine tool is provided for machining a hard material, the tool coupled to the output shaft, for example a bit, a screwdriver, a drill or the like, can stop abruptly. When the machine tool is used for machining a soft material but also a hard material, for example as the drilling progresses, a torque applied to the output shaft increases until said torque reaches a permissible threshold torque. Furthermore, the output shaft can also not reach a defined minimum speed in a specified time interval during startup and therefore, for example, a drill is detected that was already detected at the start of a machining process. In these cases, the machine tool is transferred from the first operating mode into the second operating mode.

The energy-efficient operation of the machine tool in the second operating state is achieved by adapting a maximum level of the current pulses depending on the actual charge status of the battery, such that when the charge state decreases, the power consumption is also reduced and the machine tool can thus advantageously be operated in the second operating mode for a long time. Furthermore, the method according to the invention can be used to ensure in a simple manner that a voltage is safely above a defined threshold value in the course of operating the machine tool in the second operating mode.

In an advantageous embodiment of a method according to the invention, a maximum level of current pulses which are applied to the electric motor in the second operating mode does not increase, and in particular decreases over time.

The maximum level of the first current pulse and/or the maximum level of the second current pulse can be discretely, i.e. for example in steps, or, in particular in the case of continuous monitoring of the charge status of the battery, continuously adapted depending on the charge status of the battery.

In a particularly advantageous embodiment of a method according to the invention, first current pulses and second current pulses are applied to the electric motor in the second operating mode, the level of a maximum amperage of the first current pulses being greater than the level of a maximum amperage of the second current pulses. By providing the first and second current pulses with different maximum amperages, the machine tool can be operated in a particularly energy-efficient manner in the second operating mode, the first current pulses being provided with the larger maximum amperage in order to release the output shaft or a tool coupled to the output shaft from the particular surface. In contrast, the second current pulses are provided with the smaller maximum amperage in order to provide the user, in the second operating mode of the machine tool, with haptic feedback comparable to a machine tool designed so as to have a mechanical coupling when the coupling is released. It was found that lower maximum amperages are sufficient for this purpose. A sequence of first current pulses and second current pulses takes place, in particular on the basis of a specified pattern.

A level of the maximum amperage of the first current pulses and/or a level of the maximum amperage of the second current pulses can be adapted depending on the charge state of the battery, and in particular can decrease over time.

In an advantageous embodiment of a method according to the invention, the electric motor is controlled in the second operating mode alternately by a defined number of first current pulses and a defined number of second current pulses, this sequence in particular being repeated. The defined sequence achieves, in a simple manner, desired haptic feedback and a desired torque transmitted to the output shaft in an energy-efficient manner, which torque is provided, for example, in order to release a bit which is becoming locked in a surface.

It is particularly advantageous, with regard to haptic feedback and to power consumption, if the electric motor is controlled in the second operating mode alternately by a first current pulse and then a plurality of second current pulses, in particular two to twenty, preferably five to fourteen, more preferably eight to ten, in particular nine second current pulses.

In order to be able to transmit as large a torque as desired to the output shaft in the second operating mode and at the same time to achieve low power consumption, it is advantageous if the electric motor is controlled in the second operating mode such that the length of the first current pulses differs from a length of the second current pulses, the first current pulses in particular being longer than the second current pulses, and preferably being substantially twice as long as the second current pulses. This is based on the knowledge that short second current pulses compared with the first current pulse are sufficient in order to achieve desired haptic feedback, whereas longer current pulses are useful for releasing the tool.

A time interval between successive current pulses can correspond in particular to a length of the first current pulse. An interval between all of the current pulses can be substantially identical.

It is particularly energy efficient if the electric motor is controlled in the second operating mode such that the maximum amperage of the first current pulses is between 25% and 80% larger, particularly preferably substantially 50% larger than the maximum amperage of the second current pulses. The ratio of the maximum amperage of the first current pulses to the maximum amperage of the second current pulses can also change throughout.

If a transition of the machine tool from the first operating mode into the second operating mode is provided, it is advantageous if, proceeding from a first operating mode of the machine tool, an amperage substantially equal to the value zero is applied to the electric motor for a defined period of time before a transition into the second operating mode, and the electric motor in particular is stopped.

For example, in order to be able to continue a drilling process after releasing a drill from the surface, in an advantageous embodiment of a method according to the invention, the machine tool is transferred from the second operating mode into the first operating mode when a torque which is determined by the device and applied to the output shaft is smaller than a threshold torque. In this case, the electric motor can be accelerated to a desired speed by means of a specified ramp, for example.

In order to protect the electric motor from damage, the electric motor can be stopped if the electric motor is in the second operating mode over a period of time greater than a predefined threshold value. As a result, the machine tool is protected in particular from damage due to overheating of components of the machine tool, in particular electronics, a rotor, or turns of the electric motor.

In an advantageous embodiment of the invention, the device is designed to determine a torque applied to the output shaft, the machine tool being operated in the first operating mode when the torque determined by the device is less than a defined threshold torque, and the control device transferring the machine tool from the first operating mode into the second operating mode when the torque determined by the device exceeds the defined threshold torque. The determined torque corresponds to the parameter determined by the device. The device can be designed as an algorithm stored in the control device, which calculates or estimates the torque applied to the output shaft on the basis of input parameters such as, for example, a motor speed and an actually present amperage.

Furthermore, the device can be designed to determine an acceleration value of the output shaft, the machine tool being transferred from the first operating mode into the second operating mode if the determined acceleration value of the output shaft exceeds a defined negative acceleration value and the output shaft is therefore braked more strongly than a defined value. This can occur in particular if, for example, a drill is locked in a hard surface. The determined acceleration corresponds to the parameter determined by the device.

Furthermore, the parameter determined by the device can be a rotational speed of the drive shaft, the machine tool being transferred from the first operating mode into the second operating mode if a rotational speed of a motor shaft or of the output shaft does not reach a defined threshold speed after a specified period of time. As a result, it can be determined in particular if, for example, a tool that is coupled to the output shaft is already locked in a surface at the beginning of a machining process.

A machine tool having a battery, an electric motor which is designed to rotationally drive an output shaft that can be coupled to a tool, a control device for actuating the electric motor, and a device for determining a parameter, is therefore also provided, the machine tool being operated using a method described in more detail above.

A machine tool according to the invention has the advantage that it can provide a user with haptic feedback comparable to that of a machine tool having a mechanical coupling, in a structurally simple, inexpensive, weight-optimized and energy-efficient manner, in the event that a braking torque applied to the output shaft is greater than a defined threshold torque and releases the mechanical coupling.

The energy-efficient operation of the machine tool in the second operating state is achieved by adapting a maximum level of the current pulses depending on the actual charge status of the battery, such that when the charge state decreases, the power consumption is also reduced and the machine tool can thus advantageously be operated in the second operating mode for a long time. Furthermore, it can be ensured that a voltage is safely above a defined threshold value in the course of operating the machine tool in the second operating mode.

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

BRIEF DESCRIPTION OF THE DRAWINGS

In the drawings, identical and equivalent components are provided with the same reference signs.

In the drawings.

DETAILED DESCRIPTION

Figure 1:
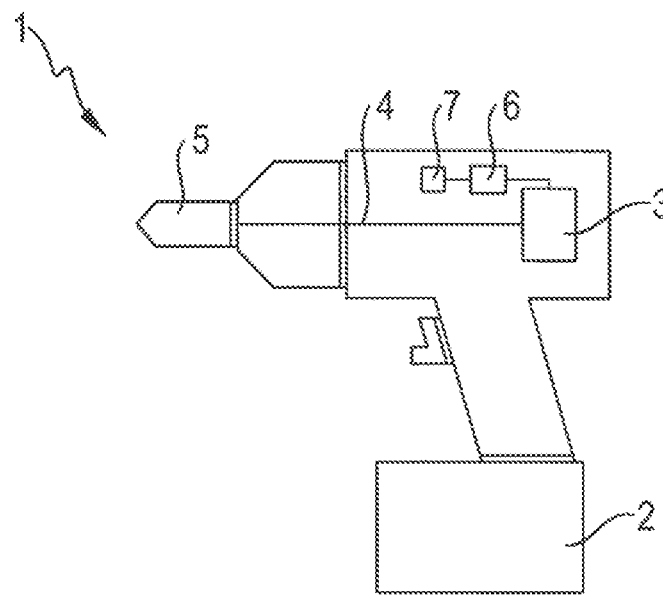
FIG. 1 is a greatly simplified representation of a machine tool having a battery, an electric motor and a control device for actuating the electric motor.

FIG. 1 is an exemplary flow diagram of an embodiment of a method according to the invention for operating a machine tool 1, in particular a cordless screwdriver, a drilling machine or the like. The machine tool 1 has a battery 2, which is provided in order to supply power to an electric motor 3 of the machine tool 1. The electric motor 3 is designed to rotationally drive an output shaft 4 of the machine tool 1, it being possible for the output shaft 4 to be coupled to a tool 5, for example a bit, a drill or the like. The machine tool 1 also has a control device 6 for actuating the electric motor 3, the control device 6 being designed to actuate the electric motor 3 in a controlled manner on the basis of an amperage. The machine tool 1 also has a device 7 for determining a parameter of the machine tool 1, in particular a torque applied to the output shaft 4 and/or an acceleration value of the output shaft 4. The machine tool 1 is designed so as to not have a mechanical coupling, such that the electric motor 3 is operatively connected directly to the output shaft 4, optionally by means of an interposed gear.

The machine tool 1 can be operated in a first operating mode and in a second operating mode. This is discussed in more detail below.

The method begins with the start S. In a first step S1, the machine tool 1 is operated in accordance with a user request in the first operating mode which corresponds, for example, to a normal drilling mode.

In a second step S2, the device 7 detects a defined operating state in which continued operation in the first operating mode can, for example, damage the electric motor 3, in particular as a result of overheating. In this case, the device 7 detects or determines, for example, an undesirably high braking torque applied to the output shaft 4 of the tool 5 which exceeds a specified threshold value or a threshold torque. This can occur, for example, when drilling a hole at an advanced borehole depth. Alternatively, the defined operating state can be detected by the device 7 in that the determined absolute value of the acceleration of the output shaft 4 is greater than a defined threshold value and the tool 5 thus experiences a defined braking. This can occur, for example, when a tool 5 becomes locked.

The device 7 can be designed, for example, as an algorithm stored in the control device 6, which determines or calculates or estimates a parameter directly or indirectly from other input values and compares said parameter with a defined threshold value. The parameter can be, for example, the torque applied to the output shaft 4 or an acceleration value of the output shaft 4.

After a corresponding detection of the defined operating state, the electric motor 3 is braked to a speed $n_{mot}$ substantially equal to zero by the control device 6 in step S3.

The control device 6 then transfers the machine tool 1 into the second operating mode in step S4, which has the purpose of releasing the tool 5 and providing haptic feedback to the user which is comparable to a machine tool having a mechanical coupling. The second operating mode is discussed in more detail below.

After the tool 5 has in particular been released again, i.e. if, for example, the device 7 detects that a torque applied to the output shaft 4 is less than a defined torque value, in step S5 the control device 6 transfers the machine tool 1 back into the first operating mode, and in step S6 it is checked in turn whether a defined operating state as described above occurs again.

In step E, the method is ended, for example, as requested by the user.

Figure 2:
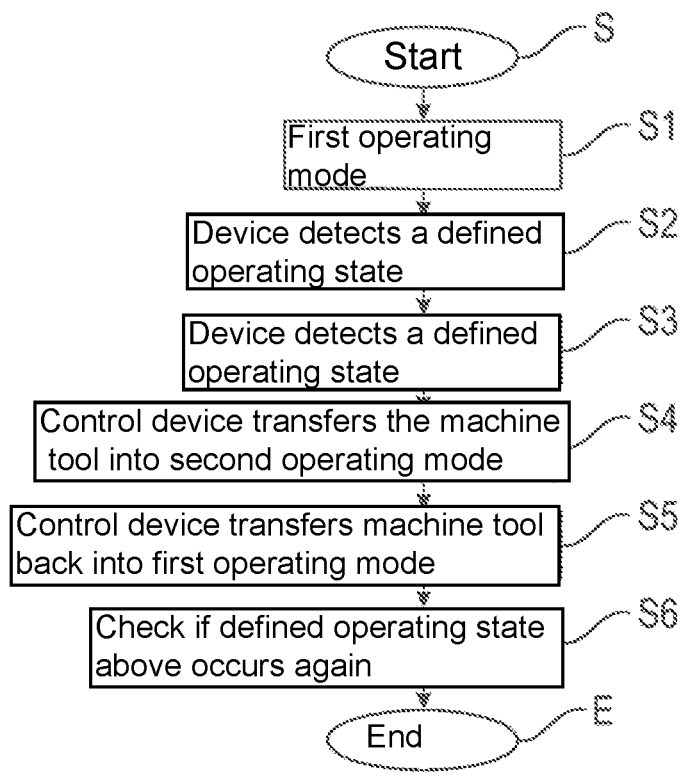
FIG. 2 is a simplified flow diagram of a method for operating the machine tool according to FIG. 1.

FIG. 2 shows an exemplary sequence of a drilling process, the curve of the motor speed $n_{mot}$ being shown in the upper diagram and an actual curve of the amperage A over time being shown in the lower diagram. The amperage curve substantially corresponds to a curve of a torque applied to the output shaft 4.

The machine tool 1 is operated in a first phase P1 in the first operating mode, the motor speed $n_{mot}$ substantially constantly assuming an operating value $n_{mot1}$ and the amperage A which is required for operating the electric motor 3 being below a threshold value $A_{threshold}$. An applied load torque can also be estimated in the control device 6 instead of the amperage A.

At a point in time t1, the amperage A increases up to the threshold value $A_{threshold}$ and/or the estimated load torque increases up to a threshold value $M_{threshold}$. This is due, for example, to the fact that the tool 5 enters deeper into a surface and/or the tool 5 locks and becomes stuck in a surface. The defined operating state is determined by the control device 6. In order to protect the electric motor 3 from overheating or other damage, the motor speed $n_{mot}$ is subsequently substantially set to the value zero in a second phase P2 up to the point in time t2.

Figure 4:
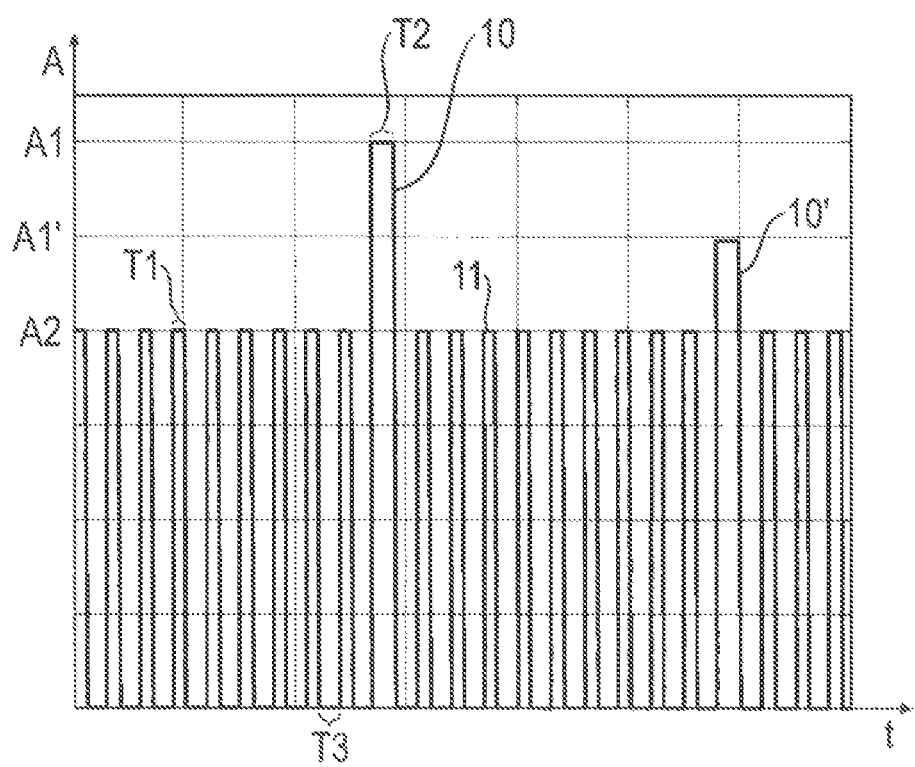
FIG. 4 is a simplified view of a portion of an amperage profile to which the electric motor is controlled in the second operating mode by a control device.

In the following third phase P3, the machine tool 1 is transferred from the first operating mode into the second operating mode, in which the control device 6 acts on the electric motor 3 using a predefined amperage profile, a portion of which is shown in FIG. 4.

Figure 3:
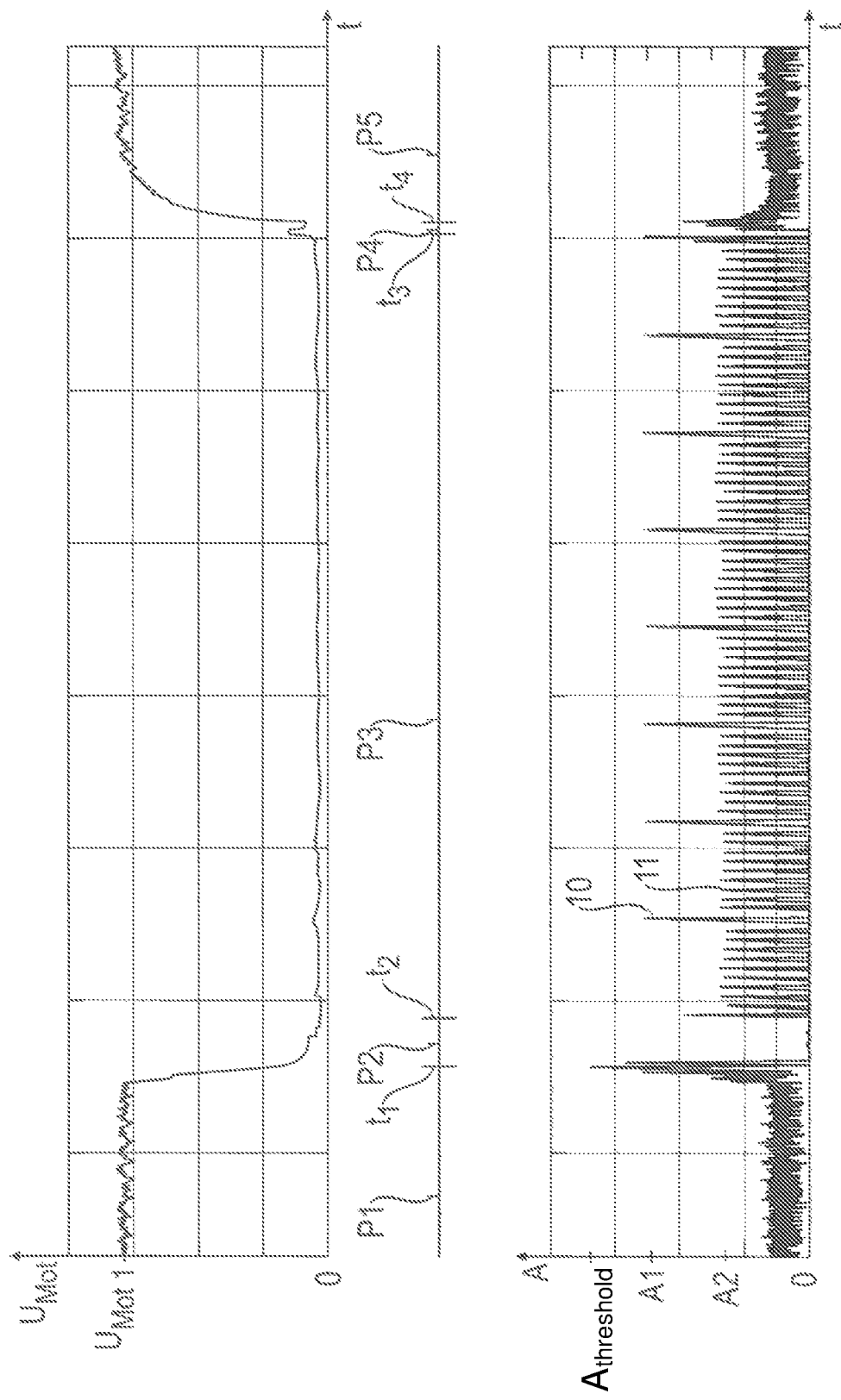
FIG. 3 shows simplified diagrams which represent, over a period of time, a speed of an electric motor and an amperage which acts on the electric motor, the diagrams showing the operation of the machine tool first in a first operating mode, then in a second operating mode and finally in the first mode of operation again.
Figure 5:
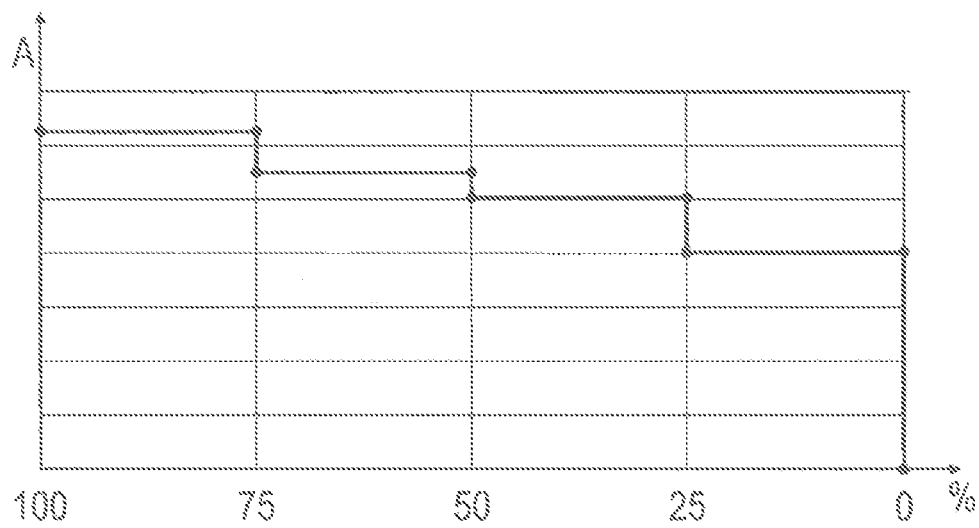
FIG. 5 is a simplified view of a relationship between a charge state of a battery of the machine tool and a maximum amperage of a current pulse of an amperage profile.

The electric motor 3 is controlled by the control device 6 in the second operating mode on the basis of the amperage profile, of which a portion is shown in FIG. 3, or is regulated to this amperage profile. The amperage profile has first current pulses 10 and second current pulses 11, which in the present case are designed as rectangular pulses. The maximum amperage A2 of the second current pulses 11 is substantially constant for all the first current pulses 11, the amperage A2 in the present case being approximately 50% smaller than a maximum amperage A1 of the first current pulse 10. The first current pulse 10 according to FIG. 4 has a maximum amperage A1 which corresponds to a fully charged state of the battery 2. The maximum amperage A1 of the first current pulse 10 decreases depending on the charge state of the battery 2, a further first current pulse 10' having a maximum amperage A1' less than the maximum amperage A1. FIG. 5 shows an example of a dependence of the maximum amperage of the first current pulses 10 on the charge state of the battery 2, the maximum amperage of the first current pulses 10 decreasing in the present case in discrete values as the charge state of the battery 2 decreases. The charge state of the battery 2 is shown in FIG. 5 as a percentage of a maximum charge state of the battery 2.

Alternatively, the maximum amperage of the first current pulses 10 can also decrease substantially continuously when contemporary or actual information regarding the charge state of the battery 2 is available.

Alternatively or in addition, the maximum amperage of the second current pulses 11 can also decrease depending on the charge state of the battery 2.

The first current pulses 10, 10' extend over a first time period T1, which in the present case is substantially twice as long as a time period T2 of the second current pulses 11. A time period T3 between two successive current pulses 10, 10', 11 in the present case substantially corresponds to the time period T1 of the first current pulse 10, 10'.

In the amperage profile, nine second current pulses 11 follow a first current pulse 10, 10' in the present case. It has been found that this results in a favorable compromise between desired haptic feedback to the user which is comparable to that of a machine tool having a releasing mechanical coupling, and low power consumption. In particular, the first current pulses 10, 10' apply a torque to the output shaft 4, which is intended to release the tool 5 from the locked situation.

At a point in time t3 in the diagrams according to FIG. 3, the motor speed $n_{mot}$ increases up to the point in time t4 in a fourth phase P4, this being due to the locking situation of the tool being removed. Subsequently, the machine tool 1 is returned to the first operating state by the control device 6 in a fifth phase P5 starting from the point in time t4, the motor speed $n_{mot}$ being returned to the value $n_{mot1}$ after an acceleration phase.

If, alternatively, the operation of the machine tool 1 over a defined period of time does not result in a lockage of the tool 5 being released, the electric motor 3 can be stopped in order to prevent the electric motor 3 from overheating.

Figure 6:
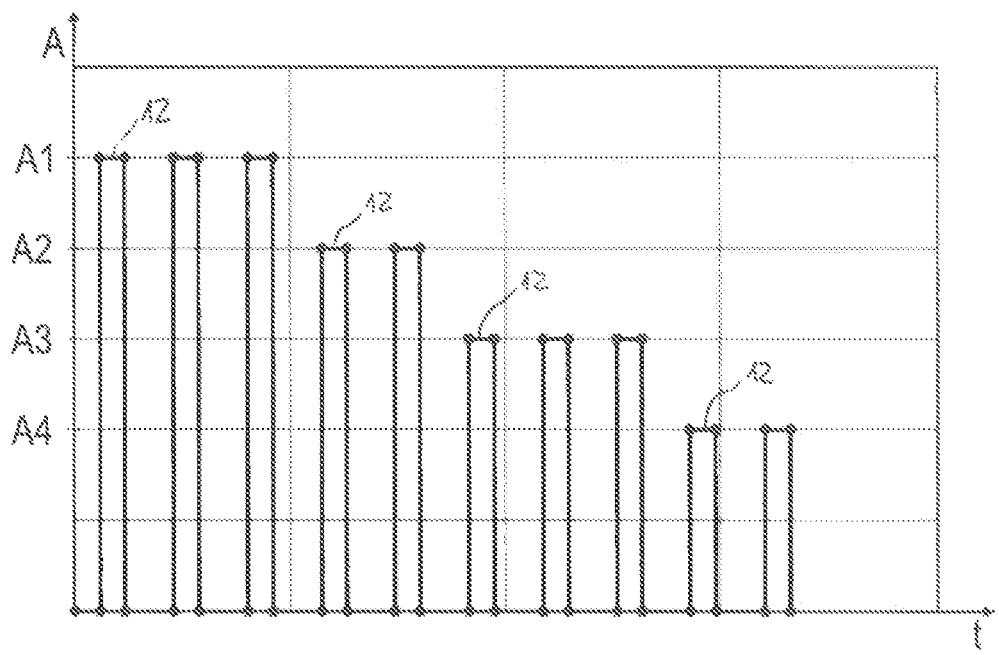
FIG. 6 is a simplified view of a portion of an alternative amperage profile to which the electric motor is controlled by a control device in the second operating mode.

FIG. 6 shows an alternatively designed amperage profile which, in contrast to the amperage profile according to FIG. 4, does not have two types of current pulses which fundamentally differ from one another, but only provides one type of current pulse 12. The current pulses 12 differ from one another in the present case only in the level of the maximum amperage, which in the manner described above is dependent on the charge state of the battery 2 and decreases over time from a value A1 to a value A4 in the present case. The maximum amperage of the first current pulses 10 decreases in discrete values in the present case as the charge state of the battery 2 decreases.

Alternatively, individual or a plurality of current pulses 12 of the amperage profile can extend over a longer period of time than other current pulses 12, such that the longer current pulses entailing greater current consumption for applying as high an output torque as desired to the output shaft 4 and the further current pulses for achieving desired haptic feedback are comparable to a released mechanical coupling.

Alternatively, the maximum amperage of the first current pulses 10, 10' or of the current pulses 12 can also decrease substantially continuously if contemporary or actual information regarding the charge state of the battery 2 is available.

LIST OF REFERENCE SIGNS

1 Machine tool
2 Battery
3 Electric motor
4 Output shaft
5 Tool
6 Control device
7 Device
10, 10' First current pulse
11 Second current pulse
12 Current pulse
$A_{threshold}$ Threshold value
A1, A1', A2, A3, A4 Maximum amperage
$n_{mot}$ Motor speed
$n_{mot1}$ Operating value of the motor speed
E, S, S1-S6 Method step
P1-P4 Phase
T1, T2, T3 Period of time
t1 to t5 Point in time

What is claimed is:

1. A method for operating a machine tool having a battery, an electric motor designed to rotationally drive an output shaft couplable to a tool, a controller for actuating the electric motor, and a device for determining a parameter, the machine tool operable in a first operating mode and a second operating mode, and the controller transferring the machine tool from the first operating mode into the second operating mode if the parameter exceeds or falls below a defined threshold value, the method comprising:

controlling the electric motor in the second operating mode by an amperage profile, the amperage profile comprising current pulses, a maximum amperage of the current pulses being varied depending on an actual charge status of the battery;

the current pulses including at least one first current pulse and second current pulses in the second operating mode alternately by the first current pulse and then a plurality of second current pulses.

2. The method as recited in claim 1 wherein the maximum amperage of the current pulses applied to the electric motor in the second operating mode decreases over time.

3. The method as recited in claim 1 wherein the maximum amperage of the current pulses is adjusted continuously depending on the charge status of the battery.

4. The method as recited in claim 1 wherein the maximum amperage of the current pulses is adjusted discretely depending on the charge status of the battery.

5. The method as recited in claim 1 wherein a maximum amperage of the first current pulses is greater than a maximum amperage of the second current pulses.

6. The method as recited in claim 1 wherein the electric motor is controlled in the second operating mode alternately by a defined number of the first current pulses and a defined number of the second current pulses of the current pulses.

7. The method as recited in claim 1 wherein a number of the plurality of second current pulses is two to twenty.

8. The method as recited in claim 7 wherein the number of the plurality of second current pulses is five to fourteen.

9. The method as recited in claim 8 wherein the number of the plurality of second current pulses is eight to ten.

10. The method as recited in claim 1 wherein the electric motor is controlled in the second operating mode such that a length of the first current pulses of the current pulses differs from a length of the second current pulses of the current pulses.

11. The method as recited in claim 10 wherein the first current pulses are longer than the second current pulses.

12. The method as recited in claim 11 wherein the first current pulses are twice as long as the second current pulses.

13. The method as recited in claim 5 wherein the electric motor is controlled in the second operating mode such that the maximum amperage of the first current pulses of the current pulses is between 25% and 80% larger than the maximum amperage of the second current pulses of the current pulses.

14. The method as recited in claim 13 wherein the electric motor is controlled in the second operating mode such that the maximum amperage of the first current pulses is 50% larger than the maximum amperage of the second current pulses.

15. The method as recited in claim 1 wherein proceeding from the first operating mode of the machine tool, an amperage substantially equal to the value zero is applied to the electric motor for a defined period of time before a transition into the second operating mode.

16. The method as recited in claim 1 further comprising transferring the machine tool from the second operating mode into the first operating mode when a torque determined by the device for determining the parameter determinator and applied to the output shaft becomes less than a threshold torque.

17. The method as recited in claim 1 further comprising stopping the electric motor when the machine tool is in the second operating mode for a period of time greater than a predefined threshold value.

18. The method as recited in claim 1 wherein the parameter determined by the device for determining the parameter is a torque applied to the output shaft, the machine tool being operated in the first operating mode when the determined torque is less than a defined threshold torque, and the machine tool being transferred from the first operating mode into the second operating mode when the determined torque exceeds the defined threshold torque.

19. The method as recited in claim 1 wherein the parameter determined by the device for determining the parameter is an acceleration value of the output shaft, the machine tool being transferred from the first operating mode into the second operating mode when the determined acceleration exceeds a defined negative acceleration value.

20. The method as recited in claim 1 wherein the parameter determined by the device for determining the parameter is a speed of the drive shaft, the machine tool being transferred from the first operating mode into the second operating mode if a speed does not reach a defined threshold speed after a specified period of time.

21. A machine tool comprising: a battery; an electric motor designed to rotationally drive an output shaft couplable to a tool; a controller for actuating the electric motor, and a device for determining a parameter, the machine tool being operated according to the method as recited in claim 1.

22. The method as recited in claim 1 wherein the machine tool is a cordless screwdriver and the tool is a bit.

* * * * *